(12) United States Patent
Menard et al.

(10) Patent No.: US 10,529,157 B2
(45) Date of Patent: Jan. 7, 2020

(54) METHOD FOR SECURE TRANSMISSION OF A VIRTUAL KEY AND METHOD FOR AUTHENTICATION OF A MOBILE TERMINAL

(71) Applicant: VALEO COMFORT AND DRIVING ASSISTANCE, Créteil (FR)

(72) Inventors: Eric Menard, Créteil (FR); Aymeric Chalochet, Créteil (FR); Fabienne Masson, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 68 days.

(21) Appl. No.: 15/531,156

(22) PCT Filed: Dec. 22, 2015

(86) PCT No.: PCT/FR2015/053720
§ 371 (c)(1),
(2) Date: May 26, 2017

(87) PCT Pub. No.: WO2016/102888
PCT Pub. Date: Jun. 30, 2016

(65) Prior Publication Data
US 2017/0330402 A1    Nov. 16, 2017

(30) Foreign Application Priority Data
Dec. 23, 2014 (FR) .................... 14 03003

(51) Int. Cl.
*G07C 9/00* (2006.01)
*H04W 12/04* (2009.01)
(Continued)

(52) U.S. Cl.
CPC .......... *G07C 9/00309* (2013.01); *B60R 25/01* (2013.01); *B60R 25/209* (2013.01);
(Continued)

(58) Field of Classification Search
CPC ... H04W 4/80; H04W 12/04; H04W 12/0023; G06F 21/60; G06F 8/60; G06F 8/61;
(Continued)

(56) References Cited

U.S. PATENT DOCUMENTS

2008/0150683 A1* 6/2008 Mikan ............... G07C 9/00309
340/5.31
2012/0159152 A1* 6/2012 Ha .......................... H04L 63/06
713/155
(Continued)

FOREIGN PATENT DOCUMENTS

EP    2 743 868 A1    6/2014
EP    2743868 A1 *    6/2014    ............. G06Q 10/02

OTHER PUBLICATIONS

International Search Report issued in PCT/FR2015/053720 dated Apr. 13, 2016 (3 pages).
(Continued)

*Primary Examiner* — Tae K Kim
(74) *Attorney, Agent, or Firm* — Osha Liang LLC

(57) ABSTRACT

The invention relates to a method for transmission of a secure virtual key (VK) from a server (50, S) to a mobile terminal (20, T) capable of communicating with the server (50, S), comprising the steps of: a) reception by the server (50, S) of a certification request from the mobile terminal (20, T), b) provision and downloading on the mobile terminal (20, T), by the server (50, S), of a user application (25), and c) provision of the mobile terminal (20, T), by the server (50, S), with a virtual key (VK), and d) downloading and securing of the virtual key (VK) in a security element (27) of the mobile terminal (20, T), characterised in that said security element is formed by an encrypting software environment (27).

11 Claims, 2 Drawing Sheets

(51) Int. Cl.
*H04W 12/06* (2009.01)
*B60R 25/01* (2013.01)
*B60R 25/20* (2013.01)
*B60R 25/24* (2013.01)
*H04L 9/08* (2006.01)
*H04W 12/08* (2009.01)
*E05B 81/54* (2014.01)
*G06F 8/60* (2018.01)

(52) U.S. Cl.
CPC ........ *B60R 25/241* (2013.01); *G07C 9/00857* (2013.01); *H04L 9/0894* (2013.01); *H04W 12/04* (2013.01); *H04W 12/06* (2013.01); *E05B 81/54* (2013.01); *G06F 8/60* (2013.01); *G07C 2009/0042* (2013.01); *G07C 2009/00412* (2013.01); *G07C 2009/00865* (2013.01); *H04L 2209/16* (2013.01); *H04W 12/08* (2013.01)

(58) Field of Classification Search
CPC ....... H04L 63/08; H04L 63/06; H04L 63/062; H04L 67/12; H04L 67/306; H04L 2209/84; H04L 63/0428; H04L 9/0819; H04L 9/0894; H04L 9/0897; G07C 9/00309; G07C 9/00857; G07C 2009/00865; G07C 2009/0088; G07C 2009/00198; G07C 2009/00341; B60R 25/241; B60R 25/01; B60R 2325/205
See application file for complete search history.

(56) References Cited

U.S. PATENT DOCUMENTS

| | | | | | |
|---|---|---|---|---|---|
| 2013/0014274 | A1* | 1/2013 | Goodes | ............... | G06F 21/6209 726/26 |
| 2013/0179005 | A1* | 7/2013 | Nishimoto | .......... | B60R 25/1001 701/2 |
| 2013/0204423 | A1* | 8/2013 | Overman | .............. | H04L 9/0866 700/117 |
| 2013/0259232 | A1* | 10/2013 | Petel | ................... | H04L 63/0492 380/270 |
| 2013/0282587 | A1* | 10/2013 | Le Buhan | ................ | G01D 4/00 705/63 |
| 2013/0282589 | A1* | 10/2013 | Shoup | .................... | G06F 21/34 705/67 |
| 2014/0156111 | A1* | 6/2014 | Ehrman | ............. | G06Q 30/0645 701/2 |
| 2014/0266594 | A1* | 9/2014 | Reiser | ..................... | B60R 25/24 340/5.72 |
| 2015/0045013 | A1* | 2/2015 | Simmons | .............. | H04W 4/008 455/420 |
| 2015/0072616 | A1* | 3/2015 | Rong | .................... | H04W 8/183 455/41.1 |
| 2015/0161832 | A1* | 6/2015 | Esselink | ............ | G07C 9/00015 340/5.22 |
| 2015/0239357 | A1* | 8/2015 | Huntzicker | ......... | B60L 11/1809 701/22 |
| 2015/0339334 | A1* | 11/2015 | Hanke | .................. | H04L 67/306 707/736 |
| 2015/0356797 | A1* | 12/2015 | McBride | ........... | G07C 9/00119 340/5.61 |
| 2015/0363986 | A1* | 12/2015 | Hoyos | ................. | G07C 9/00563 340/5.61 |
| 2016/0055699 | A1* | 2/2016 | Vincenti | ............ | G07C 9/00309 340/5.61 |
| 2016/0098870 | A1* | 4/2016 | Bergerhoff | ......... | G07C 9/00007 340/5.61 |
| 2016/0098871 | A1* | 4/2016 | Oz | ...................... | G07C 9/00111 340/5.61 |
| 2016/0140649 | A1* | 5/2016 | Kleve | ................ | G06Q 30/0645 705/307 |

OTHER PUBLICATIONS

Written Opinion of the International Searching Authority issued in PCT/FR2015/053720 dated Apr. 13, 2016 (5 pages).
Wyseur; "White-Box Cryptography: Hiding Keys in Software"; NAGRA Kudelski Group, Switzerland (9 pages).

* cited by examiner

METHOD FOR SECURE TRANSMISSION OF A VIRTUAL KEY AND METHOD FOR AUTHENTICATION OF A MOBILE TERMINAL

TECHNICAL FIELD OF THE INVENTION

The present invention generally relates to the control of functionalities of a motor vehicle by means of a mobile terminal.

It relates more particularly to a method for secure transmission of a virtual key from a server to a mobile terminal suitable for communicating with the server.

It also relates to a method for authentication of a mobile terminal by an electronic control unit of a motor vehicle.

The invention is used particularly advantageously in the case where the controlled functionality is the unlocking of the vehicle doors or the starting of the vehicle.

TECHNOLOGICAL BACKGROUND

It has been proposed to control some functionalities of a motor vehicle, such as unlocking the doors of the vehicle, by means of a mobile terminal, for example a cell phone commonly used by the owner of the vehicle.

In order to permit this control only to persons who are indeed authorized, a virtual key is used which is stored in the cell phone, the presence of which is verified by an electronic control unit of the vehicle before commanding the unlocking of the doors.

In the same way that there are several physical keys for each vehicle so that the owner of the vehicle can easily lend or rent out the vehicle thereof to another user, it is necessary to be able to assign several virtual keys to several cell phones.

The method allowing the owner to transmit a virtual key to the cell phone of another user currently consists, for the owner, in sending to a server a virtual key request accompanied by the cell phone number to which this virtual key should be assigned.

Then, the server develops a virtual key and transmits it to the cell phone. For security reasons, this virtual key is provided to be stored in a physical security element of the mobile terminal, for example in a protected area of the SIM (Subscriber Identity Module) card of this cell phone.

In order to access this physical security element, it is necessary beforehand to request special access from the cell phone operator.

This request for access is restrictive for various reasons. Thus, it complicates the process for virtual key sharing. It also slows it down since the speed of the user receiving the virtual key depends on the speed of the operator in responding to the request for access to the physical security element. Finally, setting up this access authorization, in an automatic manner, proves to be complicated in practice.

Moreover, since some operators or manufacturers of cell phones do not wish to give access to the protected area of the cell phones thereof, the loan of the motor vehicle may sometimes prove to be impossible.

OBJECT OF THE INVENTION

In order to overcome the aforementioned disadvantages of the prior art, the present invention proposes storing the virtual key no longer in a physical security element of the cell phone, but rather in a secure software part stored in the memory of the phone.

More particularly, the invention proposes a method for secure transmission of a virtual key from a server to a mobile terminal suitable for communicating with the server, including the steps of:

a) the server receiving a certification request for the mobile terminal, b) the server providing and downloading a user application to the mobile terminal, and c) the server providing a virtual key to the mobile terminal, and d) downloading and securing the virtual key in a security element of the mobile terminal, characterized in that said security element is formed by an encryption software environment.

Thus, the invention provides for storing the virtual key no longer in a physical security element of the cell phone, but rather in an encryption software environment.

In this way, thanks to the invention, it is no longer necessary to request access authorizations from the cell phone operators in order to be able to secure the virtual key, which facilitates the process for sharing virtual keys.

In the invention, the encryption software environment then has a virtual safe function, in which it is possible to hide the virtual key in order to secure it.

Other advantageous and non-limiting features of the transmission method according to the invention are as follows:

- the security element is integrated into the user application downloaded in the step b), and in the step d), said securing includes an operation of encrypting and storing the virtual key via said encryption software environment;
- prior to the step d), there is provided a step of the server providing, to the mobile terminal, said encryption software environment, and a step of the mobile terminal downloading said encryption software environment, and in the step d), said securing includes an operation of encrypting and storing the virtual key, via said encryption software environment;
- said encryption software environment operates using a white-box cryptography technique;
- said encryption software environment includes a unique algorithm, developed specifically for said mobile terminal;
- in the step a), said certification request includes an identification number associated with said mobile terminal;
- the server providing said encryption software environment comprises an operation of sending to the mobile terminal, by means of the identification number associated therewith, a message for access to said encryption software environment;
- it is envisaged to secure, in said encryption software environment, an interface application suitable for communicating with a user application which is stored in the mobile terminal, outside said encryption software environment;
- regular steps for updating by the server are provided for the input key for said encryption software environment;
- in the step b), the virtual key is developed from a root key and from at least one public derivation parameter;
- since the virtual key has a predetermined expiry date, there are provided, after the step c), regular steps of updating the virtual key and of providing the virtual terminal, via the server, with said updated virtual key.

DETAILED DESCRIPTION OF AN EXEMPLARY EMBODIMENT

The description which will follow with reference to the appended drawings, which are given as non-limiting examples, will explain the features of the invention and how it can be achieved.

In the appended drawings:

FIG. 1 shows a context example in which the invention can be implemented, in particular comprising a server, a motor vehicle and a mobile terminal;

FIG. 2 schematically shows components, useful in understanding the invention, of the motor vehicle and of the mobile terminal of FIG. 1;

Figure 1:
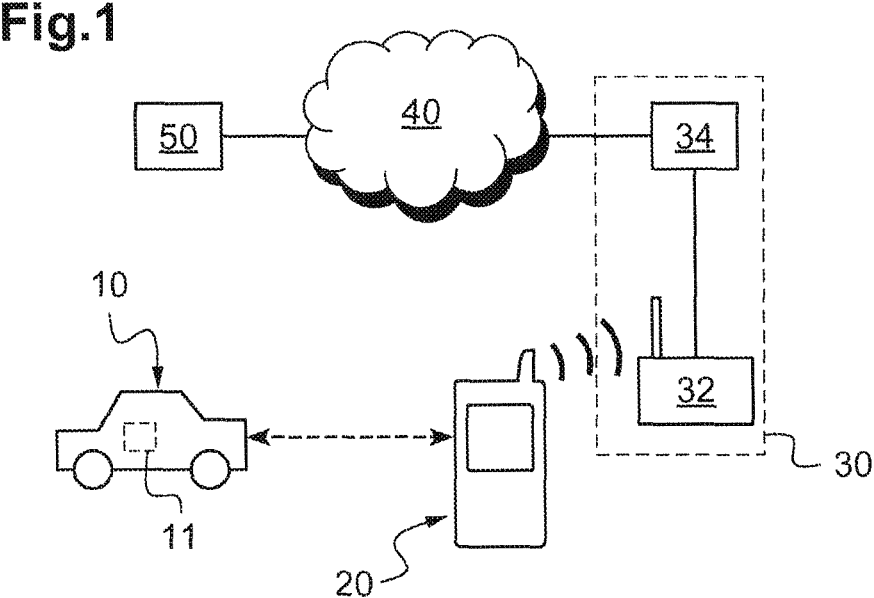
FIG. 1 shows a context example in which the invention can be implemented.

In this context, a motor vehicle 10 comprises an electronic control unit (ECU) 11 which is suitable for controlling functionalities of the motor vehicle 10 and which can communicate, via a wireless link, with a mobile terminal 20.

This may be a cell phone, preferably of the "smartphone" type. It could also be a connected watch, a connected pair of glasses, etc.

The electronic control unit 11 is suitable for communicating with this mobile terminal 20 in order to exchange data, for example for controlling the functionalities of the motor vehicle 10 by means of the mobile terminal 20 (wherein such a functionality can be, for example, the unlocking of the doors of the motor vehicle 10 or the starting of the engine of the motor vehicle 10), as explained below.

The wireless link used to communicate between the electronic control unit 11 and the mobile terminal 20 is, for example, of Bluetooth type.

The mobile terminal 20 is, furthermore, designed to connect to a cell phone network 30 which comprises, in particular, a base station 32 in communication, via a radio link, with the mobile terminal 20, and a gateway 34 for connection to a public network 40, such as the Internet.

For this purpose, it includes means for connecting to the base station 32, by a mobile telephony protocol of 2G, 3G, 4G or other type. The mobile terminal 20 is also provided with means for connecting to the public network via a WIFI protocol (typically a protocol governed by the standards of the IEEE 802.11 group).

A server 50 is also connected to the public network 40 so that the mobile terminal 20 and the server 50 can communicate and exchange data via the cell phone network 30 and the public network 40.

Figure 2:
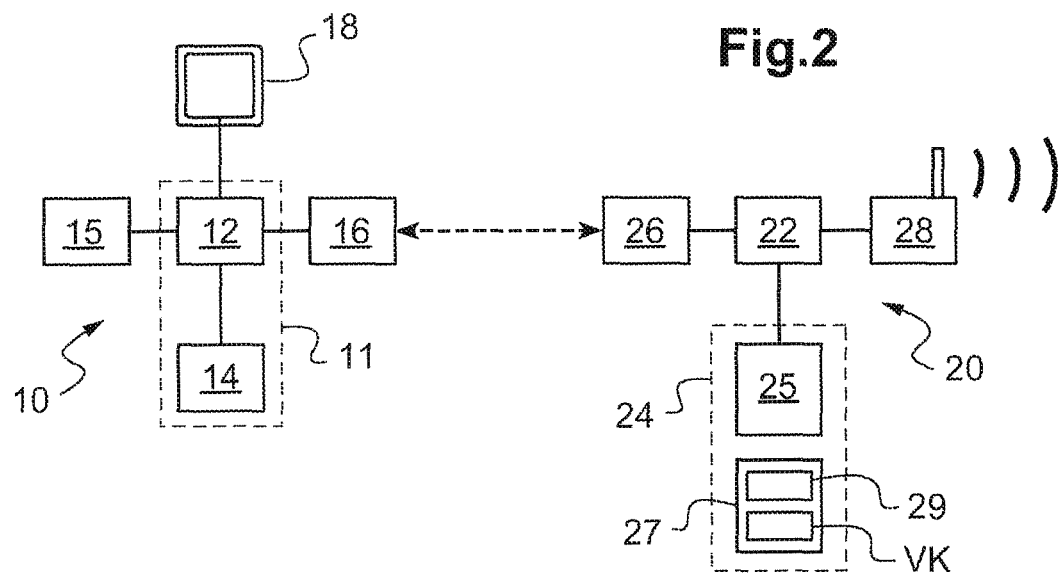

FIG. 2 schematically shows components, useful for understanding the invention, of the motor vehicle 10 and of the mobile terminal 20.

The motor vehicle 10 comprises, in particular, the above-mentioned electronic control unit 11, an actuator 15 (in this case designed to allow the doors of the motor vehicle 10 to be unlocked), a wireless communication module 16 and a user interface 18.

A Vehicle Identification Number (VIN) is assigned to the motor vehicle 10 and is stored in a database of the server 50.

The electronic control unit 11 comprises a processor 12 and a storage unit 14, for example a non-volatile memory that is rewritable, a hard disk, or a secure element.

The storage unit 14 in particular stores computer programs comprising instructions, the execution of which by the processor 12 allows the electronic control unit 11 to implement the methods described below.

The storage unit 14 also stores data used within the context of the methods described below, in particular a root key (or master key) key $VK_0$, used as explained hereafter.

The root key $VK_0$ is written, for example, in the storage unit 14 during the manufacture of the electronic control unit 11, before this electronic control unit 11 is mounted in the motor vehicle 10.

The root key $VK_0$ is also stored at the server 50, in conjunction with the VIN identification number, or any other specific identifier associated with the electronic unit assigned to the motor vehicle 10.

The mobile terminal 20 comprises a processor 22, a memory 24 (for example a rewritable non-volatile memory), a wireless communication module 26 and a module 28 for communication on the cell phone network 30.

The wireless communication module 26 of the mobile terminal 20 makes it possible to establish a wireless link (in this case of Bluetooth type as already indicated) with the wireless communication module 16 of the motor vehicle 10 through which the processor 12 of the electronic control unit 11 and the processor 22 of the mobile terminal 20 can exchange data, in particular as explained further below.

The communication module 28 allows the mobile terminal 20 (and precisely the processor 22 with which this mobile terminal 20 is provided) to exchange, as already indicated, data with other devices connected to the cell phone network 30 or to the public network 40, in particular with the server 50.

The memory 24 particularly memorizes applications comprising instructions, the execution of which by the processor 22 allows the mobile terminal 20 to implement the methods described below.

The memory 24 also stores data used in the context of the methods described below.

Figure 3:
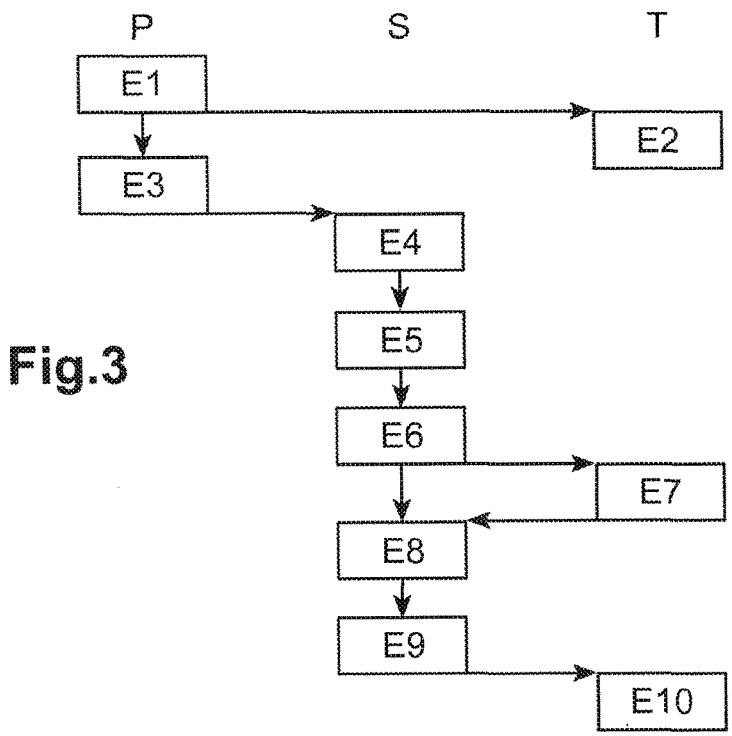
FIG. 3 shows the main the steps of a method for secure transmission of a virtual key from the server to the mobile terminal of FIG. 1.
Figure 4:
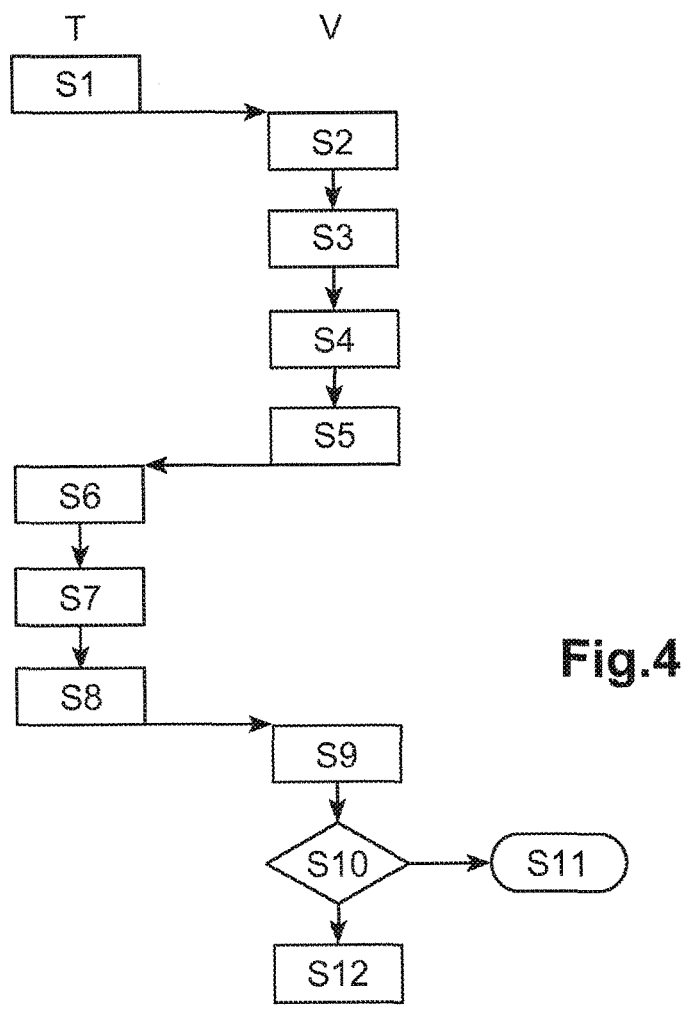
FIG. 4 shows the main the steps of a method for authentication of the mobile terminal by the motor vehicle of FIG. 1.

FIG. 3 shows the main steps of a method for secure transmission of a virtual key VK from the server 50 to the mobile terminal 20. This virtual key VK may correspond to an encryption key for the authentication with the vehicle or to this same encryption key for the authentication associated with an encryption algorithm also called a cardlet. FIG. 4 shows a method for authentication of the mobile terminal 20 by the electronic control unit 11, thanks to the virtual key VK previously transmitted by the server 50, which then allows the mobile terminal 20 to access a service for controlling functionalities of the motor vehicle 10.

For greater clarity, in the rest of the description, the term "owner P" will refer to the person who is authorized to transmit a key for accessing the motor vehicle 10 to a third party. This will generally be the owner of the vehicle.

The term "user" will refer to the person to whom the owner P wishes to lend or rent out the motor vehicle 10 thereof, whether for a fixed period or not.

The mobile terminal 20 (also referenced T in FIG. 3) will refer to the cell phone of the user. The cell phone of the owner P will always be referred to as the "phone of the owner P".

It will be considered that, prior to the implementation of the method for secure transmission of the virtual key VK, the mobile terminal 20 is not specifically prepared for controlling functionalities of the motor vehicle 10 and does not comprise any data associated with the motor vehicle 10. This may thus be, for example, the cell phone commonly used by the user.

It will be considered, however, that the phone of the owner P will be prepared for controlling functionalities of the motor vehicle 10 (also referenced V in FIG. 4) and for the communication with the server 50 (also referenced S in FIG. 3). It will thus carry, in particular, a user application, the advantage of which will be clearly described in the remainder of this description.

Similarly, before the implementation of the method, the mobile terminal 20 is unknown to the server 50, which therefore does not have knowledge of any data associated with this mobile terminal 20.

In the embodiment described in this case, the user carries and uses the mobile terminal 20 which, as described above, is in communication, firstly, with the electronic control unit 11 via a wireless link (for example of Bluetooth type) and, secondly, with the server 50 via a radio link up to the base station 31, and then via the gateway 34 and the public network 40.

According to an advantageous embodiment of the invention, the method for secure transmission of the virtual key VK from the server 50 to the mobile terminal 20 includes operations of:
- the server 50 receiving a certification request for the mobile terminal 20, issued by the phone of the owner P,
- the server 50 providing a dedicated application to the mobile terminal 20,
- the server 50 providing an encryption software environment (hereafter called the virtual safe 27) to the mobile terminal 20,
- the mobile terminal 20 downloading the virtual safe 27,
- the server 50 providing the virtual key VK to the mobile terminal 20, and
- downloading and encrypting the virtual key VK in the virtual safe 27.

According to another embodiment, the virtual safe is integrated directly within the dedicated application, and thus downloaded at the same time as the dedicated application.

These various operations will, in the remainder of this description, be described in detail, with reference to FIG. 3.

It will be noted, in a preliminary manner, that these steps can be implemented using the chronology shown in FIG. 3, or using a slightly modified chronology.

The first step E1 consists, for the owner P, in asking the user to download a user application 25 to the mobile terminal 20 thereof.

This user application 25 is an application that the user will be able to download on the "online store" associated with the operating system embedded on the mobile terminal 20 thereof. In practice, if the user has an iPhone®, the latter will be able to download this user application on the Apple Store® (step E2).

Once downloaded and installed on the mobile terminal 20, this user application 25 will be stored in the memory 24 (see FIG. 2).

The owner P, who already has this user application on the phone thereof, uses this application to send, to the server 50, a certification request for the mobile terminal 20 (step E3), so that the latter can receive the virtual key VK.

To send this certification request, the user application asks the owner P to enter the identification number associated with the mobile terminal T of the user (this identification number being, for example, the phone number defined in a removable card housed in the mobile terminal, of SIM card type). Once this identification number has been entered, the certification request for the mobile terminal T is sent to the server S.

This certification request then comprises the identification number of the mobile terminal T and the VIN identification number assigned to the motor vehicle 11.

In the step E4, the server 50 therefore receives this certification request. It is then programmed to transmit the virtual key VK to the mobile terminal 20, in a secure manner.

For this purpose, during a step E5, the server S will generate (or acquire from a third-party service) the virtual safe 27.

This virtual safe 27 (or "encryption software environment") will be intended to be stored in the memory 24 of the mobile terminal 20. Thus, it is provided to be deployed on an open medium, outside the physical security element of the mobile terminal (SIM card, eSE module, etc.). In this context, a hacker will be able to access this virtual safe 27. Therefore, the virtual safe 27 will form the only line of defense against this hacking.

The virtual safe 27 will then be programmed to operate, for example, using a white-box cryptography technique.

Such a cryptography technique is known to a person skilled in the art. To summarize, it consists in encrypting and hiding the data and the instructions that are intended to be secured among a flow of instructions and data of no interest, so that the hacker cannot find the data and the instructions to be secured.

For more information on this subject, it will be possible to refer to the document "White-box cryptography: hiding keys in software", by Brecht Wyseur, published for example at:
http://www.whiteboxcrypto.com/files/2012_misc.pdf Preferably, the virtual safe 27 includes a unique algorithm, developed specifically for the mobile terminal 20. In other words, each virtual safe 27 will be unique, so that a hacker having several mobile terminals will not be able to compare the virtual safes stored in these terminals in order to obtain the keys.

Each virtual safe 27 will include an input key EK, by means of which it will be possible to encrypt data in order to be able to then record the data in this virtual safe 27. The input key EK for the virtual safe 27 will then be stored in a database of the server S.

The input key EK will be transferred or downloaded with the safe 27, and then it will be updated regularly by the server 50.

In the step E6, the server S then provides this virtual safe 27 to the mobile terminal 20.

This step E6 will preferably be implemented in such a way that it makes it possible to secure the method for transmitting the virtual key VK.

For this purpose, in a preferred embodiment of the invention, the server S commands the sending, to the mobile terminal 20, of an SMS (Short Message Service) message for access to the virtual safe 27, the phone number of which, as stated, is known by the server S.

This SMS message will then include a hypertext link through which the user will be able to download the virtual safe 27, during a step E7, via a secure connection in accordance with Hypertext Transfer Protocol Secure "https".

In an alternative, this hypertext link could be sent to the user in another manner, for example by e-mail or by paper mail (by transmitting to the user an identifier and a password allowing the latter to access the link).

The virtual safe 27 could also be downloaded by the mobile terminal T by using a VPN (Virtual Private Network) protocol, i.e. by creating a private network between the server S and the mobile terminal T.

Regardless of the method used, at the end of this step E7, the memory 24 of the mobile terminal T stores the virtual safe 27.

After the server S has detected that the virtual safe 27 has been downloaded by the mobile terminal T, it develops the virtual key VK which will allow the mobile terminal T to access the motor vehicle 10 (step E8).

This virtual key VK is developed in this case by the server 50 from a root key $VK_0$ and from at least one public derivation parameter DP applied to this root key $VK_0$.

As already indicated, the root key $VK_0$ is stored in a database of the server S and in the storage unit 14 of the motor vehicle 10.

The derivation parameter(s) DP can comprise, for example, the expiration date of the motor vehicle loan, the phone number of the mobile terminal 20, etc.

During the following step E9, the server S provides the mobile terminal 20 with the virtual key VK and an interface application 29, in this case the cardlet (see FIG. 2).

This interface application 29 is designed to be used as an intermediary between the user application 25 (stored outside the virtual safe 27) and the inside of the virtual safe 27. As will be explained in detail in the remainder of this description, it will particularly make it possible to encrypt information provided by the user application 25 as a function of the virtual key VK, and to send this encrypted information back to the user application 25.

In practice, this interface application 29 will be able to be formed by a cryptographic function, noted as f in the remainder of this description. It will be noted in this case that this cryptographic function f will also be stored in the storage unit 14 of the motor vehicle 10.

In this case, providing the interface application 29 and the virtual key VK consists, for the server S, in transmitting, if necessary, this data to the mobile terminal 20, the virtual safe 27 having previously been downloaded. This interface application 29 and virtual key VK are sent via a secure Internet connection, in an encrypted form thanks to the input key EK for the virtual safe 27 (which key, as stated, is stored in a database of the server S).

In an alternative, this provision could, as in the step E6, consist in sending a hypertext link by SMS message to the mobile terminal T. Still in an alternative, this provision could be made using a different protocol, for example a VPN protocol.

In the step E10, the mobile terminal 20 therefore receives the interface application 29 and the virtual key VK in encrypted form, and stores them in the virtual safe 27 of the memory 24 thereof.

Once this step E10 has been completed, the mobile terminal 20 is certified by the server S: it includes a virtual key VK for accessing the motor vehicle 10.

At this stage, the mobile terminal 20 can therefore be authenticated by the electronic control unit 11 of the motor vehicle 10 such as to have access to the functionalities of the motor vehicle 10. The functionality considered in the rest of this description will be the unlocking of the vehicle doors.

This authentication may be carried out in the following manner, with reference to FIG. 4.

During a step S2, the electronic control unit 11 of the motor vehicle V receives a request to unlock the doors of the vehicle. In this case, it will be considered that this request is sent by the mobile terminal T.

Thus, by way of example, this request can be executed manually by the user (step S1), using the user application 25 installed on the mobile terminal T thereof, when a Bluetooth link is established between the mobile terminal T and the electronic control unit 11.

This request is formed by a set of data transmitted to the electronic control unit 11, including in particular the derivation parameters DP (the same parameters that have allowed the server S to calculate the virtual key VK from the root key $VK_0$).

In an alternative, this request could be executed in another manner. It could, for example, be executed by the user when operating one of the door handles of the motor vehicle. In this alternative, the motor vehicle would then transmit a message to the mobile terminal in such a way that the latter returns, thereto, the aforesaid derivation parameters.

In any event, when it receives a request for unlocking the doors and the derivation parameters DP, the electronic control unit 11 generates a challenge, for example a random number RND (step S3).

The electronic control unit 11 then calculates, in the step S4, a response RESP associated with this challenge RND by applying the cryptographic function f using the virtual key VK, which can be written as:

$$RESP=f(RND,VK).$$

Indeed, since the memory of the electronic control unit 11 contains the root key $VK_0$ and has received the derivation parameters DP, it is suitable for calculating the virtual key VK in advance.

The electronic control unit 11 of the motor vehicle V then sends, in the step S5, the challenge RND to the mobile terminal T, thanks to the established Bluetooth link.

In the step S6, the mobile terminal T receives the challenge RND.

The user application 25 then communicates this challenge RND to the interface application 29 which in turn calculates, in the step S7, the expected response RESP' by applying, to the challenge RND received, the cryptographic function f using the virtual key VK stored in the virtual safe 27, which can be written as:

$$RESP'=f(RND,VK).$$

In the step S8, the interface application 29 sends back this expected response RESP' to the user application 25, such that this user application 25 communicates the expected response RESP' to the electronic control unit 11, thanks to the Bluetooth link.

In the step S9, the electronic control unit 11 of the motor vehicle V therefore receives this expected response RESP'.

It then compares the response RESP with the expected response RESP', verifying whether these two responses are identical (step S10).

If identical responses are not verified, the electronic control unit 11 terminates the authentication process (step S11). Indeed, this means that the virtual key VK used by the mobile terminal 20 differs from that used by the electronic control unit 11. For example, an error message may then be displayed on the screen of the mobile terminal 20.

If identical responses are verified, the electronic control unit 11 proceeds to the step S12, by sending to the actuator 15 a control signal for the requested functionality, in this case the unlocking of the doors of the motor vehicle 10.

Of course, the present invention is by no means limited to the embodiment described and shown.

In particular, it will be possible for the virtual key to have a predetermined expiry date, and for this expiry date to be closer than the loan or rental end date for the vehicle.

In this alternative, it will then be envisaged to regularly modify the value of the virtual key, so as to better secure it again. For example, these regular updates can be carried out at a fixed interval, for example every 24 hours.

Thus, regular steps will then be provided for updating the virtual key via the server and for transmitting this new virtual key from the server to the mobile terminal, for example by means of a secure connection.

The invention claimed is:

1. A method for secure transmission of a virtual key from a server to a mobile terminal for communicating with the server, the method comprising:
    receiving, by the server, a certification request for the mobile terminal and a VIN for a motor vehicle;
    providing and downloading, by the server to the mobile terminal, an encryption software environment forming a security element of the mobile terminal, wherein the security element is associated an input key stored in the server;
    generating, by the server subsequent to detecting that the security element is downloaded to the mobile terminal, the virtual key for providing to the mobile terminal to access the motor vehicle; and
    downloading and securing the virtual key and an interface application in the security element of the mobile terminal,
        wherein content stored in the security element is accessed by a user application, installed on the mobile terminal, via the interface application, and
        wherein the virtual key and the interface application are encrypted using the input key for sending via a secured Internet connection to the mobile terminal and storing in said security element, and
    wherein the user application is stored in the mobile terminal, outside said encryption software environment, and wherein the security element is stored in the mobile terminal, outside of any physical security element of the mobile terminal.

2. The transmission method as claimed in claim 1, wherein the security element is integrated into the user application downloaded to the mobile terminal, and
    wherein said securing the virtual key in the security element of the mobile terminal includes an operation of encrypting and storing the virtual key via the encryption software environment.

3. The transmission method as claimed in claim 1, wherein
    prior to said downloading and securing the virtual key in the security element of the mobile terminal, there is provided
        a step of the server providing, to the mobile terminal, the user application, and
        a step of the mobile terminal downloading the user application, and
    wherein the certification request is sent to the server from the mobile terminal using the user application.

4. The transmission method as claimed in claim 1, wherein said encryption software environment operates using a white-box cryptography technique.

5. The transmission method as claimed in claim 1, wherein said encryption software environment includes a unique algorithm, developed specifically for said mobile terminal.

6. The transmission method as claimed in claim 3, wherein said certification request includes an identification number associated with said mobile terminal.

7. The transmission method as claimed in claim 6, wherein the server providing said encryption software environment comprises an operation of sending to the mobile terminal, by the identification number associated therewith, a message for access to said encryption software environment.

8. The transmission method as claimed in claim 1, wherein the user application is stored in the mobile terminal, outside said encryption software environment, and wherein the security element is stored in the mobile terminal, outside of any physical security element of the mobile terminal.

9. The transmission method as claimed in claim 1, further comprising updating, by the server, the input key for said encryption software environment.

10. The transmission method as claimed in claim 1, wherein the virtual key is developed from a root key and from at least one public derivation parameter.

11. The transmission method as claimed in claim 1, further comprising:
    updating the virtual key and providing the mobile terminal, via the server, said updated virtual key, wherein the virtual key has a predetermined expiry date.

* * * * *